United States Patent [19]

Ewens

[11] Patent Number: 5,579,398
[45] Date of Patent: Nov. 26, 1996

[54] ELECTRO-ACOUSTIC TRANSDUCER

[75] Inventor: Stuart C. Ewens, Chailey, United Kingdom

[73] Assignee: Knowles Electronics Co., United Kingdom

[21] Appl. No.: 256,971

[22] PCT Filed: Nov. 30, 1993

[86] PCT No.: PCT/GB93/02457

§ 371 Date: Aug. 1, 1994

§ 102(e) Date: Aug. 1, 1994

[87] PCT Pub. No.: WO94/14292

PCT Pub. Date: Jun. 23, 1994

[30] Foreign Application Priority Data

Dec. 4, 1992 [GB] United Kingdom ............... 9225650

[51] Int. Cl.$^6$ .................................................. H04R 25/00
[52] U.S. Cl. ........................ 381/154; 381/169; 381/189; 181/138; 181/198
[58] Field of Search ........................... 381/154, 155, 381/168, 169, 205, 187, 188, 189, 190; 181/22, 138, 198, 199, 242; 379/428, 432

[56] References Cited

U.S. PATENT DOCUMENTS

| | | | |
|---|---|---|---|
| 3,588,383 | 6/1971 | Carlson et al. ................. | 381/154 |
| 4,239,945 | 12/1980 | Atoji et al. ................. | 381/183 |
| 4,796,288 | 1/1989 | Busche et al. ................. | 381/169 |
| 4,843,628 | 6/1989 | Hofer ................. | 381/200 |
| 5,410,608 | 4/1995 | Lucey et al. ................. | 381/155 |

FOREIGN PATENT DOCUMENTS

| | | |
|---|---|---|
| 0074818A1 | 3/1983 | European Pat. Off. . |
| 2074418 | 10/1981 | United Kingdom . |
| 2192513 | 1/1988 | United Kingdom . |

*Primary Examiner*—Curtis Kuntz
*Assistant Examiner*—Xu Mei
*Attorney, Agent, or Firm*—Wallenstein & Wagner, Ltd.

[57] ABSTRACT

This invention relates to electro-acoustic transducers such as is generally indicated at 10 and which comprise a body 11 defining a chamber 12, a plate 13 bearing a micro-phone or speaker 14 to which is attached a stalk 15, a diaphragm 16, connectable to the stalk 15, which extends substantially across the chamber 12, an end piece 17 and an end cap 18. The end piece 17 has a kidney-shaped recess 21 which provides the main communication path between subsidiary inlets/outlets 19 and a main inlet/outlet 20. When the channel 22 is closed off by the end cap 18 it is effectively in the form of a tube and constitutes a Thuras tube. The length of this path effectively creates a long discharge path between the wearers' ear and any grounded metal part within the transducer and hence protects against electric shock.

2 Claims, 2 Drawing Sheets

5,579,398

ELECTRO-ACOUSTIC TRANSDUCER

TECHNICAL FIELD

This invention relates to electro-acoustic transducers and particularly, but not exclusively, to such transducers in the form of ear pieces for telephone headsets and the like.

BACKGROUND PRIOR ART

Telephone operators often build up very substantial static voltages on their bodies, particularly if they are imprudent enough to wear man-made fibers. If they then plug their headset into the telephone exchange apparatus, it is not uncommon for a spark to jump from their ear through the acoustic inlets in the ear piece to a grounded metal portion of the transducer. As these sparks can be derived from several thousands of volts, the sensation is at best uncomfortable. This problem particularly arises in small devices where distances between the acoustic inlets and grounded portions of transducers are normally extremely small. Additionally, it has been found difficult to produce economically and compactly a suitable method of boosting the bass response of such ear pieces.

The present invention is provided to solve these and other problems.

SUMMARY OF THE INVENTION

From one aspect the invention consists in an electro-acoustic transducer including a body defining a chamber, a diaphragm extending across at least part of the chamber to define front and rear portions, a main acoustic inlet/outlet connected to the front portion and a Thuras tube connecting the rear portion and the main inlet/outlet, wherein at least a portion of the Thuras tube is defined by an end piece forming a wall of the chamber.

In a preferred embodiment, the end piece further defines the main acoustic inlet/outlet, and the Thuras tube may be formed as a channel in that end piece. Particularly conveniently the transducer may further include a cap overlying the end piece with subsidiary inlet/outlets formed therein and offset from the main inlet/outlet. In this case the end cap may close off the channel to complete the tube.

The end cap and end piece may together define an extended air path between the subsidiary inlet/outlets and a grounded metal part within the chamber. Current designs simply have these inlets and outlets passing straight through the cap into the chamber, although sometimes there are guards to prevent mechanical damage due to penetration through these holes.

From another aspect there is provided an electro-acoustic transducer having a chamber including a grounded metal part, a non-electrically conducting cover defining a number of subsidiary acoustic inlet/outlets and a main acoustic inlet/outlet for the chamber wherein the cover defines an extended air path between the subsidiary outlets and a grounded metal part within.

As has been mentioned above, this extended path reduces the risk of electrical discharge occurring along the path typically for potential differences of up to 15,000 volts D.C.

Preferably the chamber is generally cylindrical, the main inlet/outlet is at or adjacent the axis of the chamber, the subsidiary inlets/outlets are radially offset therefrom and the main inlet/outlet is defined in the wall extending across the chamber.

Particularly conveniently the subsidiary inlets/outlets are formed in an end cap which overlies the wall and a part of the air path is defined between the air cap and the wall.

Although the invention has been defined, it is to be understood that the invention includes any inventive combination of the features set out above or in the following description.

The invention may be performed in various ways and a specific embodiment will now be described, by way of example, with reference to the accompanying drawings.

DETAILED DESCRIPTION

Figure 1:
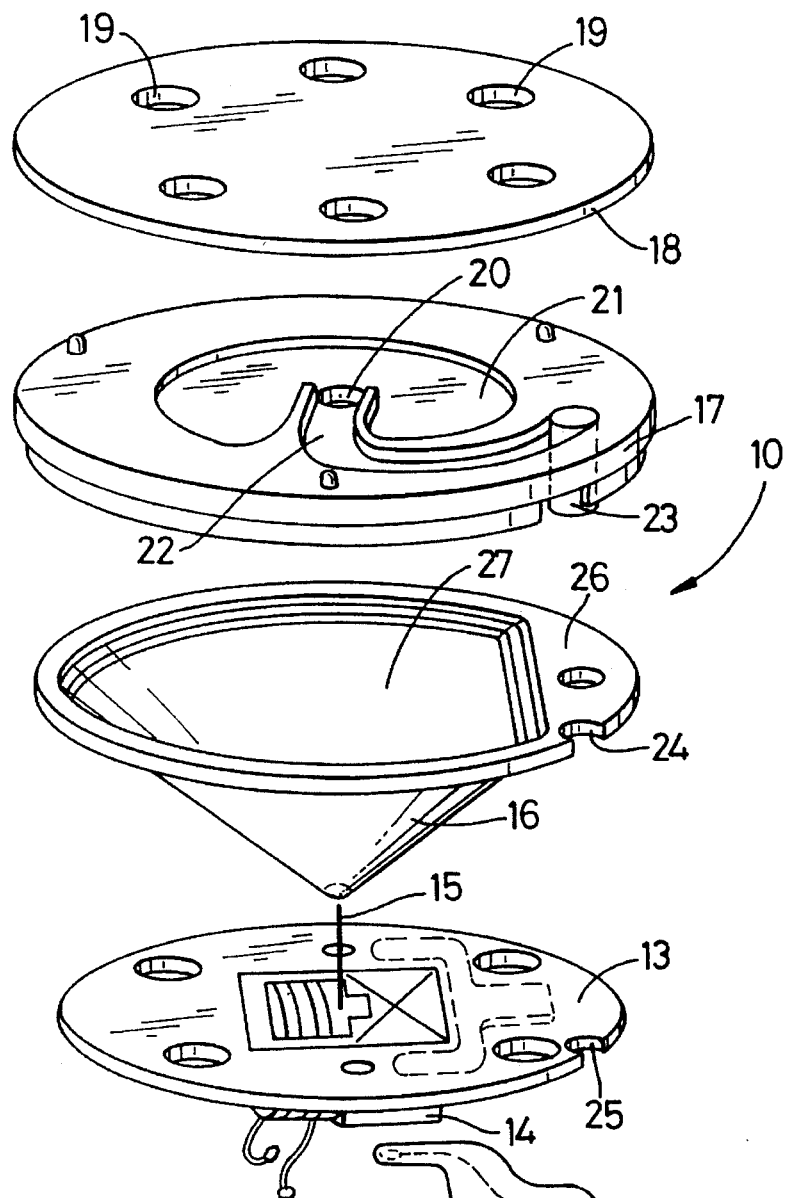
FIG. 1 is an exploded view of an electro-acoustic transducer.
Figure 1:
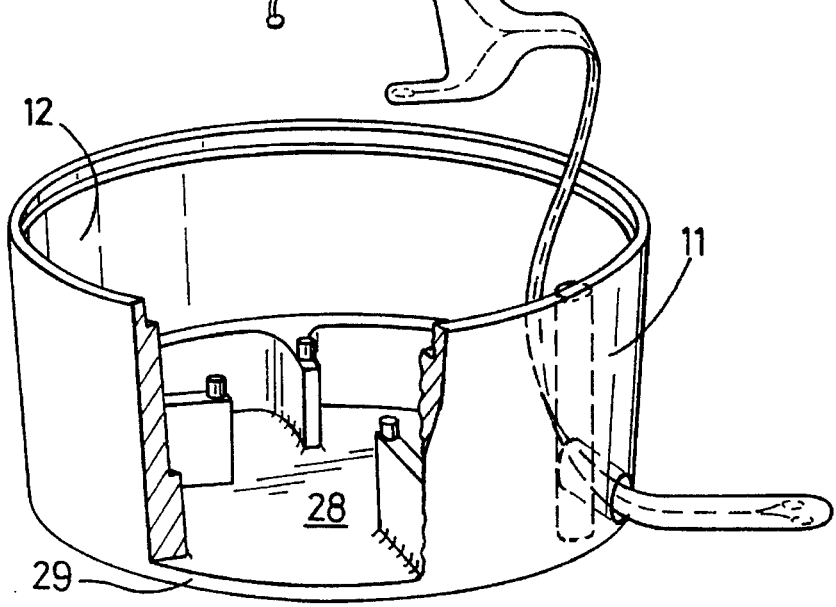
Figure 2:
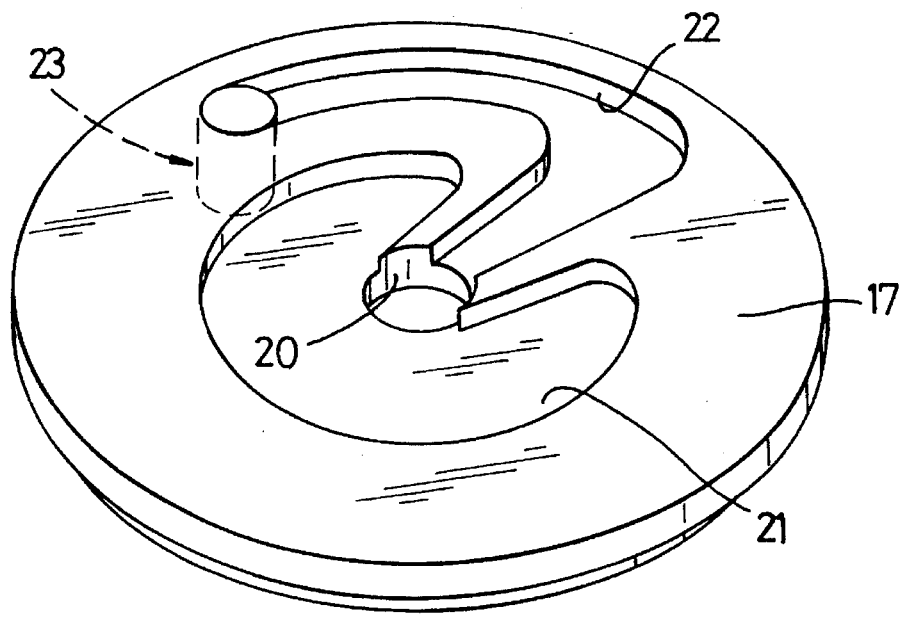
FIG. 2 is a more detailed view from above of an end piece of the transducer.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

An electro-acoustic transducer is generally indicated at 10 and comprises a body 11, defining a chamber 12, a plate 13 bearing a microphone or speaker 14 to which is attached a stalk 15, a diaphragm 16, connectable to the stalk 15, which extends substantially across the chamber 12, an end piece 17 and an end cap 18.

The end cap 18 defines a number of spaced subsidiary acoustic inlets/outlets 19, through which sound may pass either to, or from, a main acoustic inlet/outlet 20 defined in the end cap 18. This inlet/outlet 20 communicates directly with the diaphragm 16 and hence via the stalk 15, with the microphone 14.

It will be noted that the end piece 17 has a kidney-shaped recess 21, which provides the main communication path between the subsidiary inlets/outlets and the main inlet/outlet 20. A channel 22 projects into this recess 21 to extend from the main inlet/outlet 20 to a vertical shaft 23 which extends through the thickness of the end cap 18 to communicate with aligned notches 24,25 in the diaphragm support 26 and the plate 13.

It will thus be seen that the main inlet/outlet 20 communicates both with a front portion 27 of the chamber 12 contained within the diaphragm 16 and a rear portion 28 defined between the base 29 of the body 11 and the plate 13. As the end cap 18 is shaped so that it closes off the upper mouth of the channel 22, the channel 22 is effectively in the form of a tube and constitutes a Thuras tube providing bass resonance or reinforcement from the rear portion 28 of the chamber 12.

This construction is particularly compact, economic to make and easy to assemble.

As has been mentioned above, many traditional ear pieces for headsets, and indeed other transducers, have the sound inlets passing simply through the end cap 18, and the end piece 17 does not exist. This means that there is a very short discharge path between a wearer's ear and any grounded metal part within the transducer, such as the diaphragm support 26.

Figure 3:
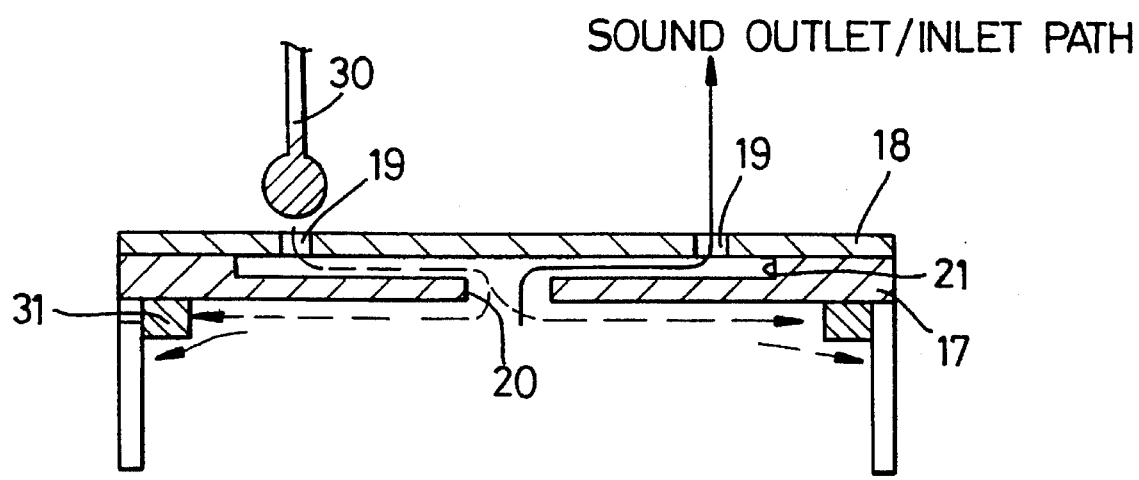
FIG. 3 is a diagrammatic cross-sectional view of the upper part of the transducer demonstrating a discharge path.

Referring to FIG. 3, it will be seen that the interposing of the end piece 17 and the provision of a central main acoustic inlet/outlet, has the effect of making a considerably extended air path between the ear (here represented as an electrode 30) and the metal part 31. The result is that very high voltages, say typically 14,000 or 15,000 volts D.C., have to be built up before a spark will jump along a path of this length. Clearly, in order for this aspect of the invention to operate, the end piece 17 and end cap 18 must be electrically insulating.

It will be appreciated that the provision of both of the extended air path and the Thuras tube in the end piece/end cap combination is particularly effective in producing a much improved transducer at low additional cost.

Although these advantages have been particularly demonstrated in connection with ear pieces, they are equally applicable to any transducer use in which large D.C. voltages are likely to occur adjacent the sound inlet/outlets.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An electro-acoustic transducer including a body defining a chamber, a diaphragm extending across at least part of the chamber to define a front chamber portion and a rear chamber portion, a grounded metal part within the rear chamber, an end piece extending across the chamber and forming a wall of the front chamber portion, the end piece having a main acoustic inlet/outlet and a Thuras tube connecting the rear portion and the main inlet/outlet, wherein at least a portion of the Thuras tube is defined by a channel formed in the end piece forming the wall of the chamber; and an end cap overlying the end piece with subsidiary inlets/outlets formed therein offset from the main inlet/outlet, said end cap closing off the channel to form said portion of the Thuras tube, said channel defining an extended air path between the subsidiary inlets/outlets and the grounded metal part.

2. The transducer of claim 1 wherein the chamber is generally cylindrical.

* * * * *